United States Patent
Domel

(10) Patent No.: US 7,763,813 B2
(45) Date of Patent: Jul. 27, 2010

(54) EASY MOUNT BASE FOR MOBILITY SCALE

(75) Inventor: Douglas R. Domel, Santa Clarita, CA (US)

(73) Assignee: Innovision Devices, LLC, Santa Clarita, CA (US)

( * ) Notice: Subject to any disclaimer, the term of this patent is extended or adjusted under 35 U.S.C. 154(b) by 186 days.

(21) Appl. No.: 12/114,975

(22) Filed: May 5, 2008

(65) Prior Publication Data

US 2008/0217072 A1    Sep. 11, 2008

Related U.S. Application Data

(63) Continuation-in-part of application No. 11/591,920, filed on Nov. 2, 2006, now abandoned.

(51) Int. Cl.
*G01G 21/28* (2006.01)
(52) U.S. Cl. ...................................... 177/238
(58) Field of Classification Search .................. D10/87, D10/91; 177/126, 127, 238–244
See application file for complete search history.

(56) References Cited

U.S. PATENT DOCUMENTS

| | | | | | |
|---|---|---|---|---|---|
| 581,889 | A | * | 5/1897 | Swindell | 177/130 |
| 3,191,701 | A | * | 6/1965 | Gray | 177/209 |
| 3,630,299 | A | * | 12/1971 | Albagli | 177/145 |
| 3,732,938 | A | * | 5/1973 | Nelson | 177/126 |
| 3,949,822 | A | * | 4/1976 | English et al. | 177/126 |
| 4,126,197 | A | * | 11/1978 | Kechely | 177/145 |
| 5,086,856 | A | * | 2/1992 | Haggstrom | 177/161 |
| 5,414,225 | A | * | 5/1995 | Garfinkle | 177/199 |
| 5,448,022 | A | * | 9/1995 | Rishel | 177/126 |
| 5,994,649 | A | * | 11/1999 | Garfinkle et al. | 177/25.11 |
| 6,380,496 | B1 | * | 4/2002 | Lohkamp | 177/144 |
| D463,302 | S | * | 9/2002 | Ariyama et al. | D10/91 |
| D464,896 | S | * | 10/2002 | Ho et al. | D10/91 |
| D489,279 | S | * | 5/2004 | Morford | D10/91 |
| D524,670 | S | * | 7/2006 | Carls | D10/91 |
| 7,683,272 | B2 | * | 3/2010 | Hong | 177/126 |

* cited by examiner

*Primary Examiner*—Randy W Gibson
(74) *Attorney, Agent, or Firm*—John L. Rogitz

(57) ABSTRACT

A base for a scale tilts slightly when a wheel is rolled onto it, to facilitate rolling the wheel onto a central ovular or elliptical concave mat surface. Opposed handgrips forming grippable loops may be provided on the base.

12 Claims, 3 Drawing Sheets

EASY MOUNT BASE FOR MOBILITY SCALE

This is a continuation in part of U.S. patent application Ser. No. 11/591,920, filed Nov. 2, 2006 now abandoned, incorporated herein by reference, from which priority is claimed.

FIELD OF THE INVENTION

The present invention relates generally to scales.

BACKGROUND OF THE INVENTION

The parent application provides a lightweight, inexpensive scale with an easily viewable weight display that can be used by a wide variety of users, particularly debilitated users in wheelchairs or rollable beds. The parent application discloses that one or more (e.g., four) bases can be provided, each with its own weight sensor, and a person in wheelchair can roll the wheels of the chair onto respective bases for weighing himself.

SUMMARY OF THE INVENTION

As understood herein, it may be problematic to roll a wheelchair onto a base of a scale system if the base has a narrow wheel channel, because the casters of many wheelchairs tend to turn and impede wheeling the chair onto the base with the wheel in the narrow channel. As also understood herein, some occupants of wheelchairs might wish to place the individual bases themselves onto a surface for weighing and then pick up and stow the bases afterward, but if the base is very low to the floor this intent can be frustrated. Still further, the present invention recognizes that it may desirable to provide mechanical advantage in rolling a wheelchair or bed onto a weight base.

Accordingly, a base for a weight measuring system for a bed- or wheelchair-bound person is disclosed herein. In addition to the parent application, the following patent documents are incorporated herein by reference: U.S. Pat. No. 6,812,662; U.S. Pat. No. 6,060,854; U.S. Patent Publication No. 2005/0215210.

A base for a scale system includes a bottom surface, at least three support pads on the bottom surface supporting the base when the base is disposed on the ground, and a generally elliptical mat surface opposed to the bottom surface. A ramp surface surrounds the mat surface and is bounded by a periphery raised from the ground when all support pads rest on the ground. With this structure, when a wheel is rolled over the periphery the ramp surface is urged toward the ground to tilt the base until the wheel clears a portion of the base to cause the base to tilt back with all pads on the ground.

A weight sensor may be disposed under the mat surface. In some examples the mat surface is centrally formed with straight, co-parallel guide grooves. The mat surface may be generally concave. First and second curved handgrips can extend in respective loops with a respective space established between each handgrip and the periphery, with a midpoint of each handgrip being higher relative to endpoints. A portion of the ramp surface may slope upwardly toward the mat surface to facilitate rolling a wheel up the ramp surface, and if desired one or more indicator lights can be energizable to indicate weighing conditions.

In another aspect, an apparatus has a base for a scale. The base tilts slightly when a wheel is rolled onto it to facilitate rolling the wheel onto a central concave mat surface of the base. Opposed handgrips form grippable loops on the base.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
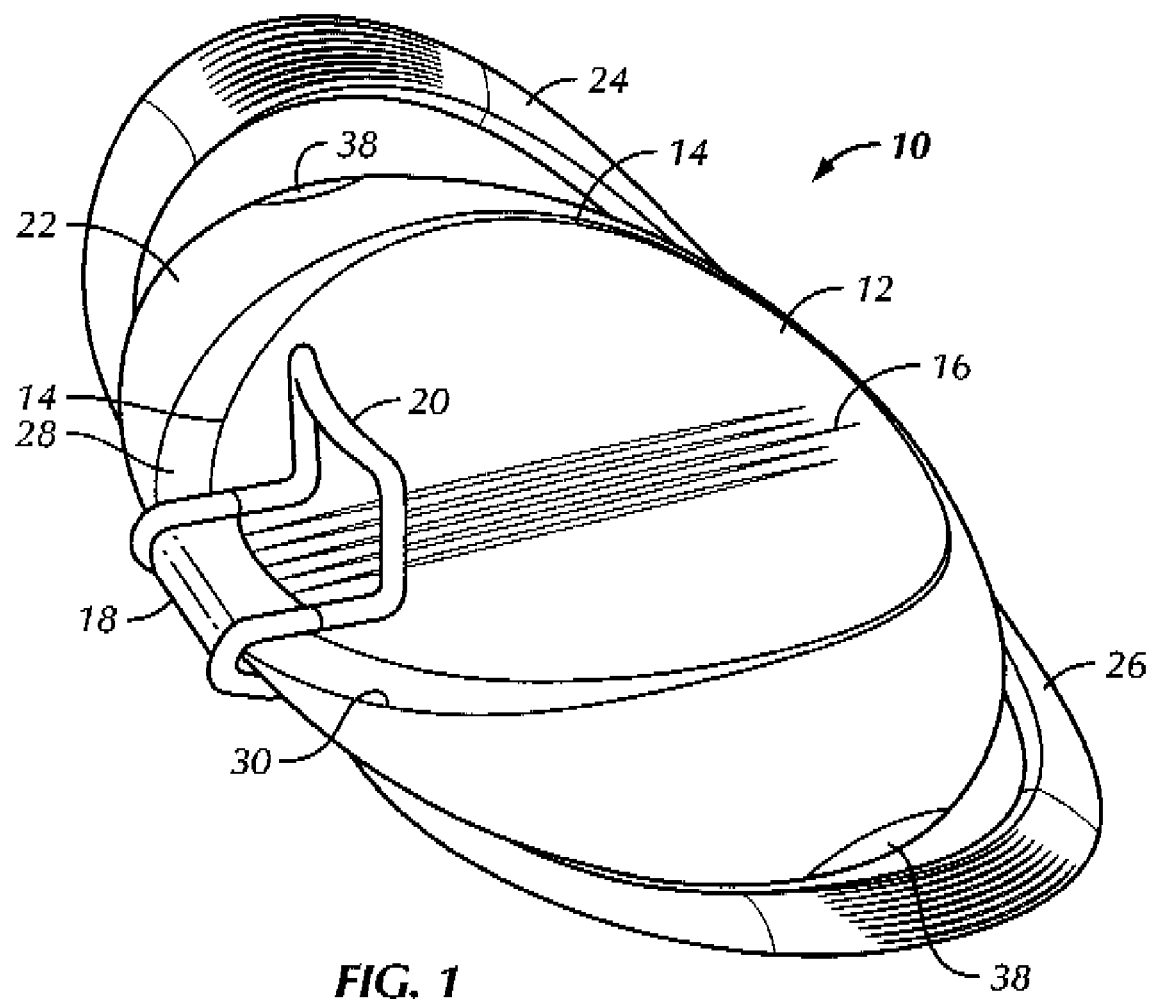
FIG. 1 is a perspective view of one implementation of the base for a scale system.

Referring to FIG. 1, a base is shown, generally designated 10, for a scale system as disclosed in the parent application. The disclosure of the parent application has been incorporated herein by reference and will not be repeated in its entirety. As disclosed in the parent application, the base 10, which may be one of plural (e.g., four) bases, one for each wheel of a wheelchair, can contain at least one weight sensor that sends signals to a processing system in the base that generates a signal representing the patient's weight, with a wireless transmitter in the base sending the signal to a nearby display (that may, e.g., be provided on a portable pod-type computing device hand-carried by an occupant of the wheelchair) so that the weight can be viewed. In other applications discussed below, e.g., golf swing analyzer, only two bases might be used. The weight displayed may be the sum of the weights from the pads (i.e., total weight) or each pad weight may be displayed individually, e.g., for golf swing analysis. Further, continuous weight readings of each individual pad may be display during a set time to indicate the transfer of weight from one pad to another during, e.g., a golf swing. More than four pads may be used in other applications. A tilt sensor may be used to deactivate the circuitry discussed in the parent application when a pad is tiled at or greater than a predetermined angle, since in use the pads are intended to lie flat and if tilted need not be energized.

Figure 2:
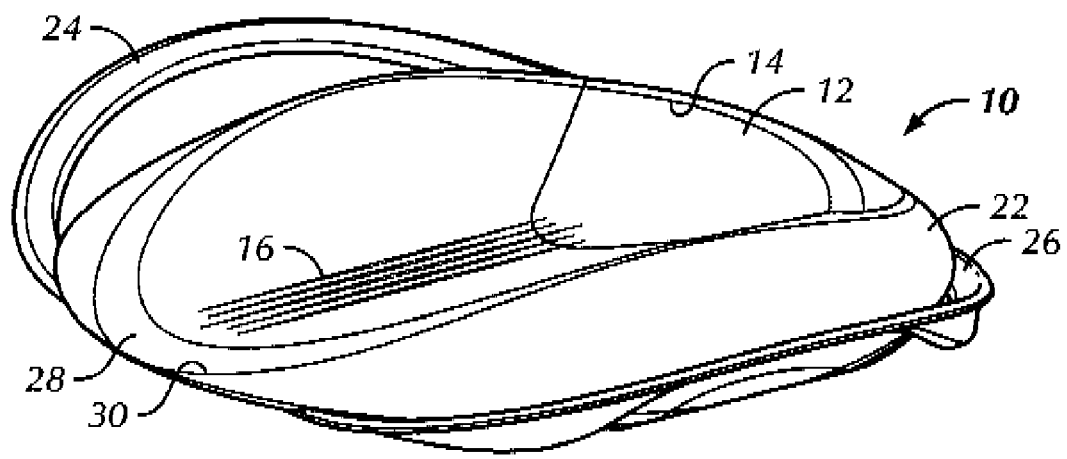
FIG. 2 is another perspective view of one implementation of the base for a scale system.

The base 10 may have a unitary plastic body made of, e.g., polyurethane, or it may be made of die cast aluminum. As shown in FIGS. 1 and 2, the base 10 has a generally partially cylindrical mat portion 12 bounded by a mat periphery 14. The mat portion 12 preferably has a diameter that is greater than the diameter of the largest wheelchair caster likely to be encountered. The mat surface 12 may be centrally formed with straight, co-parallel guide grooves 16, one of which may be highlighted with bright ink as a visual guide, with the mat surface 12 being generally concave as shown, i.e., when placed on a surface mat surface up, the mat periphery 14 is higher than the grooves 16. While the guide grooves 16 are narrow and shallow such that a wheelchair caster cannot fit into them, the mat surface 12 itself is broad, with the diameter of the mat periphery 14 in the dimension orthogonal to the guide grooves 16 being almost as great as the diameter of the mat periphery 14 in the dimension parallel to the guide grooves 16. Accordingly, the mat surface 12 may be generally ovular or elliptical or even circular. If desired, a wheel stop 18 configured as a spring clip may include an upright (relative to the mat surface 12) stop member 20, and may be clipped to the base 18 at an end of the guide grooves 16 for preventing a wheel on the mat surface 12 from rolling past the stop 18.

A body portion 22 of the base 10 is contiguous to the mat periphery 14 as shown. Details of the body portion 22 are disclosed further below. As shown in FIGS. 1 and 2, first and second curved handgrips 24, 26 (which can also serve as foot pedals to manipulate the pad using the feet) may be made integrally with the body portion 22 and extend in respective loops away from the body portion 22 to form a space between the body portion 22 and each handgrip 24, 26, with the midpoint of each handgrip 24, 26 being higher relative to its endpoints which are connected to the body portion 22. This configuration facilitates grasping of either handgrip 24, 26 by a person seated in a nearby wheelchair. The handgrips 24, 26 are opposed to each other on the body portion 22 and the tangent to the midpoint of each handgrip 24, 26 is parallel to the guide grooves 16 as shown.

FIGS. 1 and 2 show that a ramp surface 28 of the body portion 22 is contiguous to the mat periphery 14 and generally circumscribes the mat periphery 14. At least at the areas of the ramp surface 28 that are nearest the ends of the guide grooves 16, the ramp surface 28 slopes upwardly from a ramp periphery 30 that circumscribes the ramp surface 28 to the mat periphery 14 to facilitate rolling a wheel up the ramp surface 28 in the direction of the guide grooves 16 and onto the mat surface 12.

Figure 3:
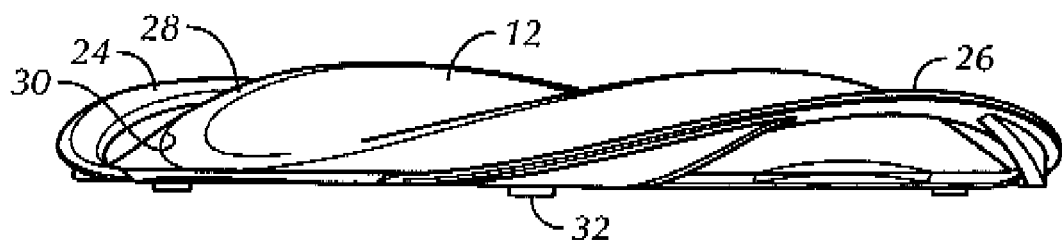
FIG. 3 is a front elevational view of the base.
Figure 4:
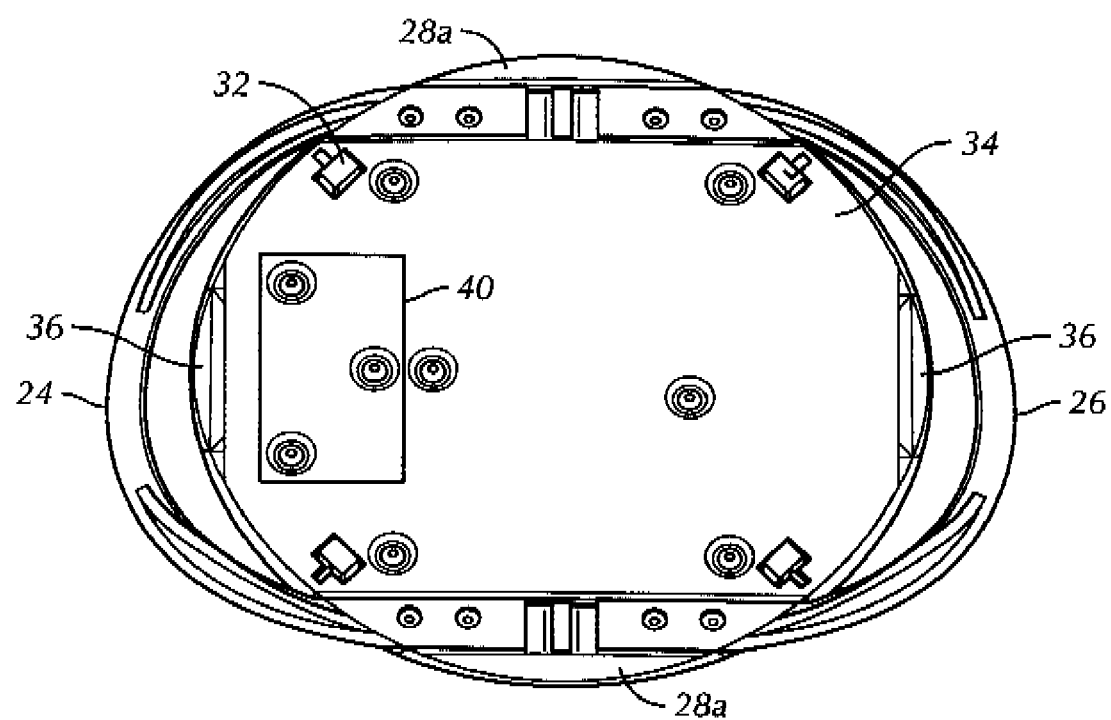
FIG. 4 is a bottom plan view of the base.

As best shown in FIGS. 3 and 4, the ramp periphery 30 is slightly raised from the ground on which the base 10 rests, typically by a distance of much less than the radius of an expected wheel. In the example shown, this is achieved by forming or attaching support pads 32 onto a substantially flat bottom surface 34 of the body portion 22. Three, four, or more support pads 32 may be used, and in the example shown the support pads 32 may be configured as small parallelepiped-shaped protrusions extending away a short distance from the bottom surface 34. Also, as best shown in FIG. 4 each support pad 32 is disposed inboard of the segment 36 of the ramp periphery 30 that is nearest the ends of the guide grooves 16.

With this structure, it may now be appreciated that as a wheel is rolled up the ramp surface 28, it pushes the flat angled (relative to the bottom surface 34) bottom 28a (FIG. 4) of the ramp surface 28 down against the surface on which the body 10 rests, thereby tilting the body 10 such that the pads 32 most distanced from the wheel contact area are raised slightly from the ground. The lowered ramp surface 28 facilitates rolling the wheel more easily onto the mat surface 12, and once the wheel clears the mat periphery 14 the base 10 tilts back to a position in which all four pads 32 are on the ground to support the base 10, producing a slight leveraging effect that provides further mechanical advantage in moving the wheel to substantially the center of the mat surface 12 for weighing.

Returning to FIG. 1, if desired indicator light windows 38 may be provided on the body portion 22 straddling the guide grooves 16. The windows 38 may contain, e.g., light emitting diodes that can be energized in different colors by the processing system to indicate various conditions, e.g., red for "error", amber for "excessive weight", and flashing blue indicating measurement is ongoing, turning to solid blue to indicate that measurement is complete.

Returning to FIG. 4, an access cover 40 may be provided in the bottom surface 34. The access cover 40 can be removed to access the processing system, weight sensor, and batteries described in the parent application.

It may readily be appreciated that four pads 10 can be arranged on the ground as appropriate for rolling respective wheels of a four-wheeled chair onto respective pads. Or, three pads 10 can be arranged on the ground as appropriate for rolling respective wheels of a three-wheeled chair onto respective pads. In this way, both types of chairs can be weighed. A user may be permitted to enter the number of pads being used so that the weight determination circuitry can multiply the signal from a single pad by the appropriate amount (three or four). In such an embodiment, only one pad 10 need contain the weight sensing structure described by the parent application, with its signal being multiplied by three or four and with the remaining pads being "dummy" pads devoid of weight sensors. Or, each pad 10 may contain weight sensing structure and each may transmit its weight signals on a respective frequency or use other means to discriminate its signals from those of the other pads, so that the (three or four) separate and distinct signals received at the display unit can be simply added together without requiring the user to enter the number of pads being used.

The present device may be used in the following non-limited applications:

1. home healthcare providers a. to weigh wheelchair bound patients b. to have a scale that is easily transportable 2. long term healthcare facilities a. to weigh wheelchair bound patients b. to weigh bedridden patients c. to allow weighing in the room d. to easily comply with HIPPA regulations 3. hospitals a. to weigh wheelchair bound patients b. to weigh bedridden patients c. to allow weighing in the room d. to easily comply with HIPPA regulations 4. high end wheelchair owners a. to weigh themselves in the home environment b. to weigh themselves on a device that is easily 5. physical therapists a. to provide a simple, accurate device to teach load bearing b. to have a rehab load bearing training device that is easily transportable 6. golf pros and advanced golfers a. to provide a simple device to train weight transfer during club swing h. to provide an easily transportable device to allow training at the range c. to provide a cost effective swing analyzer d. to have a hands free instructional device 7. Olympic and world class shooting competitors a. to train in proper stance and weight distribution b. to have a device that is easily transportable to the range c. to have a hands free instructional device 8. law enforcement pistol training a. to train in proper stance and weight distribution b. to have a device that is easily transportable to the range c. to have a bands free instructional device 9. ranch animal/wildlife weighing a. to weigh cattle/wildlife at a remote location b. to provide an easily transportable durable scale c. to have a scale that is operable in harsh environments 10. small racing vehicle weighing a. to allow for adjusting suspension setups at the track b. to provide an easily transportable durable device In some embodiments (e.g., wheelchair scale) a four digit numeric character display may be used, while for a golf swing analyzer a full dot matrix backlit LCD module may be used. Also, the read frequency of the pad output data to the display and control module may be varied, depending on the application. For example, as understood herein a golf swing analyzer requires faster pad weight readings with less required accuracy, while a scale used for wheelchair or bed hound patients with congestive heart disease or diabetes requires more accuracy and repeatability.

While the particular EASY MOUNT BASE FOR MOBILITY SCALE is herein shown and described in detail, it is to be understood that the subject matter which is encompassed by the present invention is limited only by the claims.

What is claimed is:

1. A base for a scale system, comprising:
   a bottom surface;
   at least three support pads on the bottom surface supporting the base when the base is disposed on the ground;
   a generally concave mat surface opposed to the bottom surface; and
   a ramp surface surrounding the mat surface and bounded by a periphery raised from the ground when all support pads rest on the ground, wherein when a wheel is rolled over the periphery the ramp surface is urged toward the ground to tilt the base until the wheel clears a portion of the base to cause the base to tilt back with all pads on the ground, wherein the mat surface is centrally formed with straight, co-parallel guide grooves.

2. The base of claim 1, further comprising:
   at least one weight sensor disposed under the mat surface.

3. The base of claim 1, wherein the mat surface is generally elliptical.

4. The base of claim 1, comprising first and second curved handgrips extending in respective loops with a respective space established between each handgrip and the periphery, a midpoint of each handgrip being higher relative to endpoints.

5. The base of claim 1, wherein at least a portion of the ramp surface slopes upwardly toward the mat surface to facilitate rolling a wheel up the ramp surface.

6. The base of claim 1, comprising at least one indicator light energizable to indicate at least one weighing condition.

7. Apparatus, comprising:
   a base for a scale, the base tilting back and forth when a wheel is rolled over it to facilitate rolling the wheel onto a central concave mat surface of the base, wherein the mat surface is centrally formed with straight, co-parallel guide grooves;
   opposed handgrips forming grippable loops on the base;
   a bottom surface;
   at least three support pads on the bottom surface supporting the base when the base is disposed on the ground;
   the mat surface being opposed to the bottom surface; and
   a ramp surface surrounding the mat surface and bounded by a periphery raised from the ground when all support pads rest on the ground.

8. The apparatus of claim 7, further comprising:
   at least one weight sensor disposed under the mat surface.

9. The apparatus of claim 7, wherein the mat surface is generally elliptical.

10. The apparatus of claim 7, wherein at least a portion of the ramp surface slopes upwardly toward the mat surface to facilitate rolling a wheel up the ramp surface.

11. The apparatus of claim 7, comprising at least one indicator light energizable to indicate at least one weighing condition.

12. The apparatus of claim 7, wherein a midpoint of each handgrip is higher relative to endpoints.

* * * * *